US008821128B2

(12) United States Patent
Bianchi et al.

(10) Patent No.: US 8,821,128 B2
(45) Date of Patent: Sep. 2, 2014

(54) BLADE WITH ADAPTIVE TWISTING, AND A ROTOR PROVIDED WITH SUCH A BLADE

(75) Inventors: Laurent Bianchi, Marseilles (FR); Rémy Cuenca, Lancon de Provence (FR); Mathieu Galan, Lyons (FR); Damien Reveillon, Avoine (FR)

(73) Assignee: Airbus Helicopters, Marignane Cedex (FR)

( * ) Notice: Subject to any disclaimer, the term of this patent is extended or adjusted under 35 U.S.C. 154(b) by 488 days.

(21) Appl. No.: 13/033,213

(22) Filed: Feb. 23, 2011

(65) Prior Publication Data

US 2011/0211959 A1 Sep. 1, 2011

(30) Foreign Application Priority Data

Feb. 26, 2010 (FR) ..................................... 10 00809

(51) Int. Cl.
*B64C 27/473* (2006.01)
*B64C 27/59* (2006.01)
*B64C 27/33* (2006.01)
*F03D 1/06* (2006.01)
*B64C 27/54* (2006.01)
*B29L 31/08* (2006.01)

(52) U.S. Cl.
CPC ........... *B64C 27/33* (2013.01); *F05B 2240/301* (2013.01); *Y02E 10/721* (2013.01); *F03D 1/0675* (2013.01); *B29L 2031/085* (2013.01); *B64C 27/54* (2013.01)
USPC ...................................... 416/226; 416/241 A

(58) Field of Classification Search
USPC .......... 416/226, 223 R, 204 R, 40, 41, 44, 52, 416/117, 232, 233, 229 R, 240, 241 A
See application file for complete search history.

(56) References Cited

U.S. PATENT DOCUMENTS

| 2,568,726 | A | * | 9/1951 | Franz ........................... 416/90 R |
| 4,381,902 | A | * | 5/1983 | Head et al. ................. 416/134 A |
| 4,741,943 | A | * | 5/1988 | Hunt .............................. 428/113 |
| 4,806,077 | A | * | 2/1989 | Bost .............................. 416/226 |

(Continued)

FOREIGN PATENT DOCUMENTS

| EP | 0351577 A2 | 1/1990 |
| FR | 2737465 A1 | 2/1997 |

(Continued)

OTHER PUBLICATIONS

Search Report and Written Opinion; Application No. FR 1000809; dated Oct. 7, 2010.

*Primary Examiner* — Ned Landrum
*Assistant Examiner* — Aaron Jagoda
(74) *Attorney, Agent, or Firm* — Brooks Kushman P.C.

(57) ABSTRACT

A rotor blade (1) with adaptive twisting, the blade being provided with an outer covering (2) extending along a pitch variation axis (AY) from a first end zone (3) to a second end zone (4), the outer covering (2) defining an internal cavity (8). The blade includes a strip (10) extending inside said cavity (8) along said pitch variation axis (AY), said strip (10) comprising a composite material that is anisotropic so as to be suitable for twisting under the effect of centrifugal forces (F) directed parallel to said pitch variation axis (AY) when the blade (1) is in rotation, said strip (10) being fastened to said outer covering (2) via first and second fastener means (11, 12) in order to be capable of twisting said outer covering (2).

20 Claims, 2 Drawing Sheets

(56) References Cited

U.S. PATENT DOCUMENTS

| | | |
|---|---|---|
| 5,387,083 A | 2/1995 | Larson et al. |
| 5,505,589 A | 4/1996 | Bergey |
| 6,513,762 B2 | 2/2003 | Fink et al. |
| 7,037,076 B2 | 5/2006 | Jacot et al. |
| 7,424,988 B2 | 9/2008 | McDonnell |
| 8,142,164 B2 * | 3/2012 | Rao et al. ............... 416/226 |
| 2006/0186263 A1 | 8/2006 | Becker et al. |
| 2006/0186269 A1 | 8/2006 | Kota et al. |
| 2007/0205332 A1 | 9/2007 | Mercier Des Rochettes et al. |
| 2008/0237395 A1 | 10/2008 | Tanabe et al. |

FOREIGN PATENT DOCUMENTS

| | | |
|---|---|---|
| GB | 2216606 A | 10/1989 |
| WO | 9611337 A1 | 4/1996 |
| WO | 9830448 A2 | 7/1998 |
| WO | 9936313 A1 | 7/1999 |
| WO | 0041501 A2 | 7/2000 |
| WO | 2008052677 A2 | 5/2008 |

\* cited by examiner

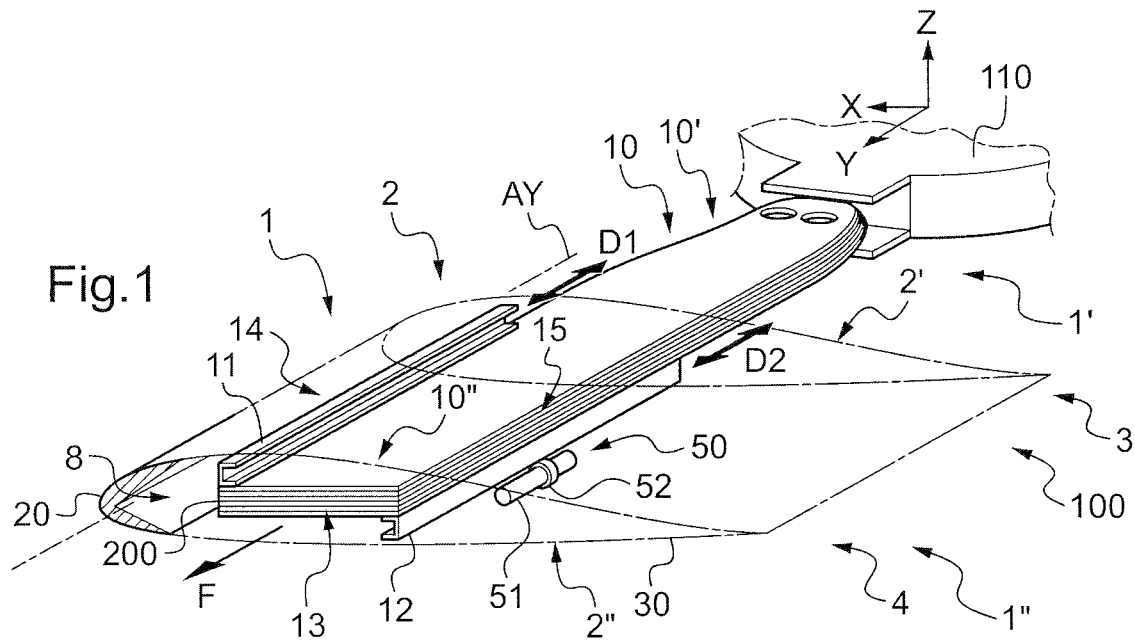
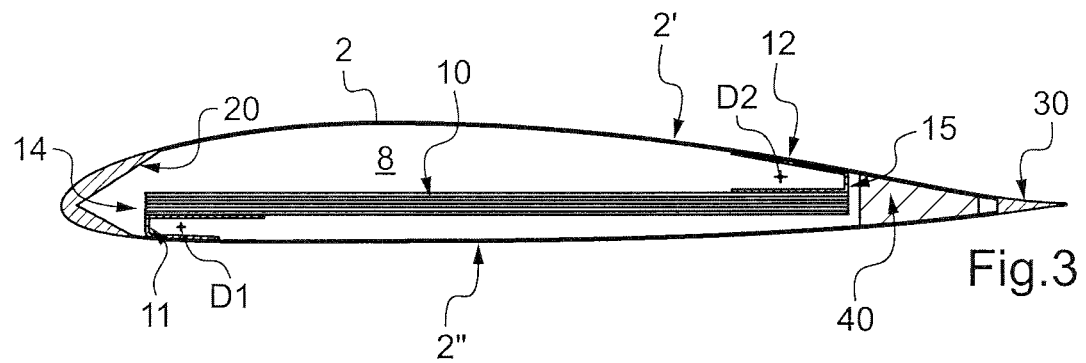
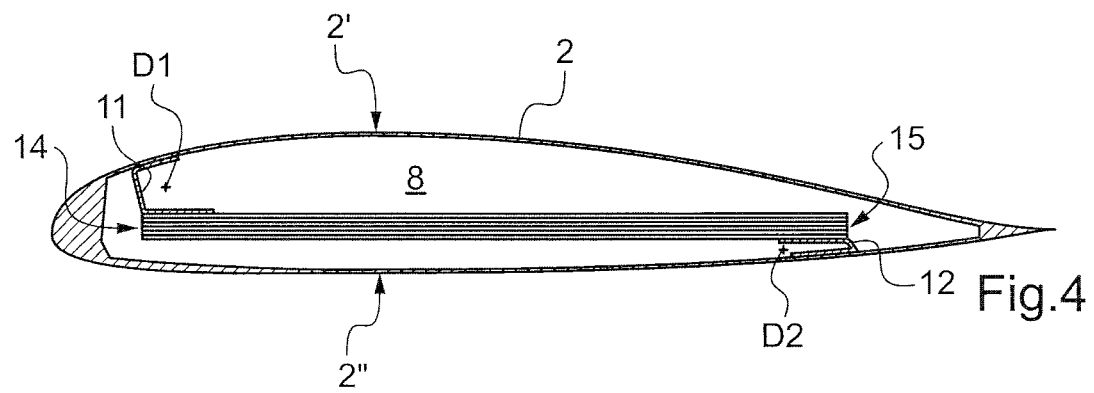

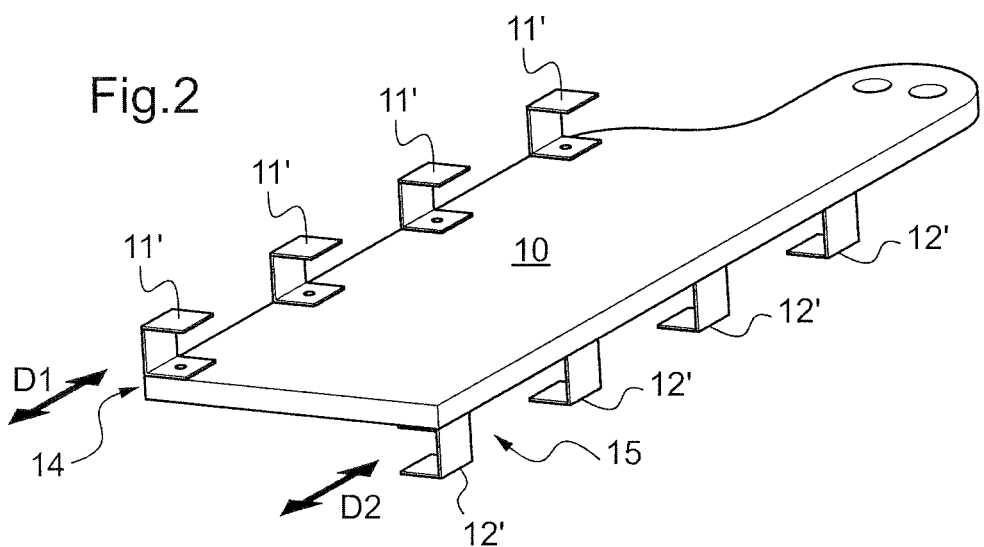
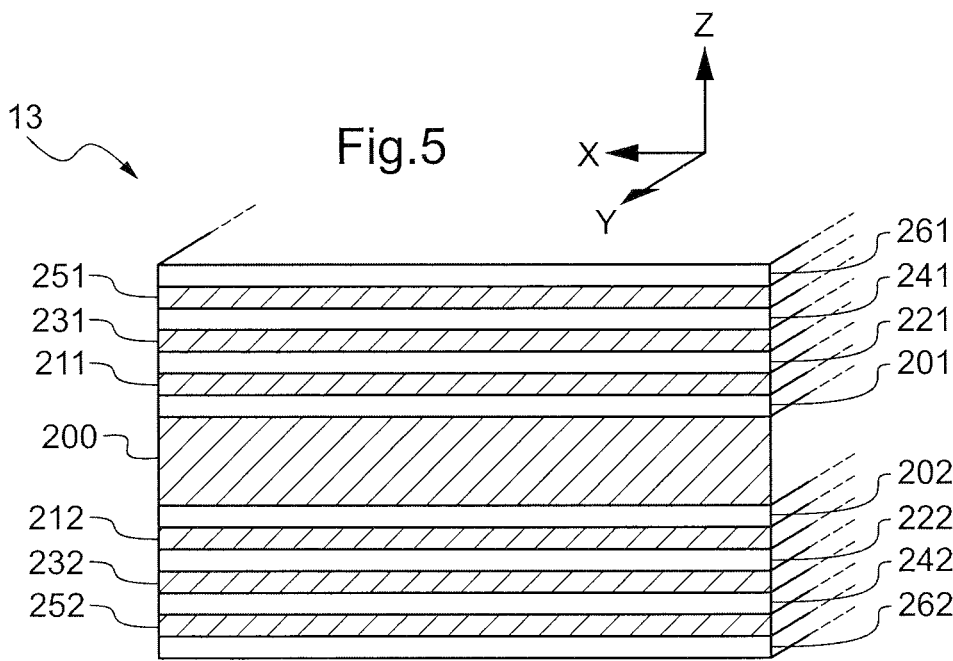
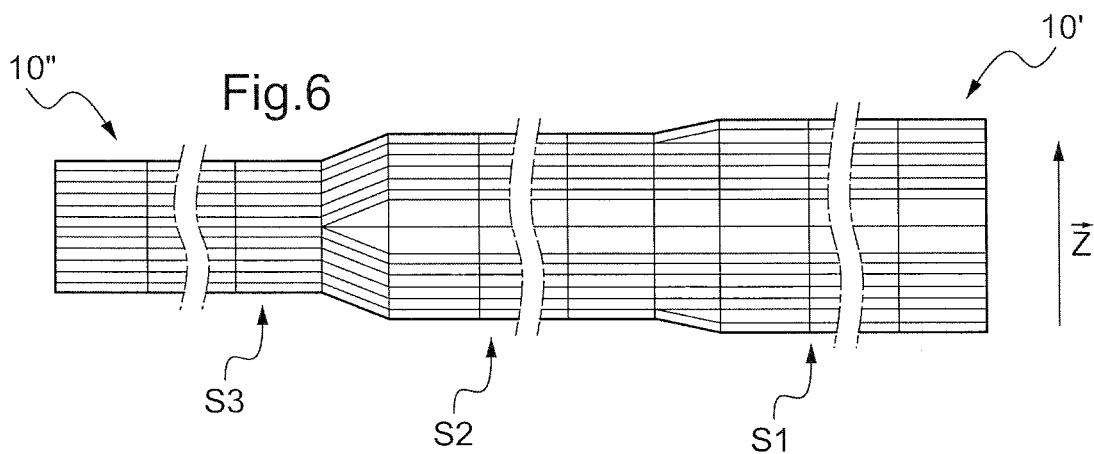

BLADE WITH ADAPTIVE TWISTING, AND A ROTOR PROVIDED WITH SUCH A BLADE

CROSS REFERENCE TO RELATED APPLICATIONS

This application claims the benefit of FR 10 00809 filed on Feb. 26, 2010, the disclosure of which is incorporated in its entirety by reference herein.

BACKGROUND OF THE INVENTION (1) Field of the Invention

The present invention relates to a blade with adaptive twisting and to a rotor provided with such a blade, and more particularly but not exclusively to a blade of a rotorcraft lift rotor.

(2) Description of Related Art

Conventionally, a blade extends longitudinally from a first end for fastening to a rotary hub of a rotor towards a second end that is referred to as a free end. Relative to the rotor, it can be understood that the blade extends radially from the first end to the second end.

Furthermore, the blade extends transversely from a leading edge to a trailing edge. The blade comprises in particular an outer covering that is provided with a first skin on its suction side, referred to for convenience as its "suction side skin", and a second skin on its pressure side referred to for convenience as its "pressure side skin".

A blade of a main lift rotor of a rotorcraft exerts lift during the rotary motion of said main rotor that enables the rotorcraft to be lifted and possibly also to be propelled. As a function of the pitch angle of the blade, the amount of lift that is developed can be made to increase or decrease. The aerodynamic angle of incidence of each aerodynamic profile of the blade, referred to as a "profile" for convenience, in a section normal to the pitch variation axis of the blade depends on the pitch angle of the blade. In contrast, it is found that from a threshold angle of incidence for a given profile, and thus for a given blade section, streams of air separate from the leading edge or the trailing edge of the profile. If the separation propagates and remains over a zone lying between two profiles that define a critical area along the span of the blade, this phenomenon causes the blade to stall, i.e. causes its lift to drop suddenly. Furthermore, air stream operation gives rise to turbulence that is the origin of an increase in the drag coefficient of the blade and to an increase in vibration.

In order to limit separation, one solution consists in giving the blade a geometrical twist. It should be observed that the geometrical twist of a blade may be defined by the angle formed between the chord of the profile of each blade section relative to a reference plane for the blade. Sometimes, each blade profile presents twist relative to the pitch variation axis of the blade at an angle that is identified relative to such a reference plane.

For a given blade trajectory, it can be understood that twist has a direct influence on the aerodynamic angle of incidence of each profile. Under such conditions, the term "twist relationship" designates the way in which said twist angles vary along the span of the blade.

The twist relationship of a blade does not vary. The twist relationship results from accepting a compromise that ensures the rotor operates properly over the entire flight domain.

It is found that a small amplitude of twist over the entire span of the blade helps minimize the power consumed by the lift rotor of a rotorcraft in forward flight. However, a large amplitude of twist over the entire span of the blade serves to minimize the power consumed by the lift rotor of a rotorcraft while hovering, but remains unacceptable during forward flight. It should be observed that the term "small amplitude" means an amplitude of less than 6 degrees, for example, whereas a "large amplitude" means an amplitude of more than 20 degrees, for example.

Thus, an amplitude of twist lying between the above small and large amplitudes represents a power consumption compromise between a stage of forward flight and a stage of hovering flight.

In order to avoid such a compromise, proposals have been made to modify the twist of a blade actively, at least locally.

In a first solution, at least one flap is used that locally extends the trailing edge of the blade. By modifying the angle at which the flap is deflected relative to the blade, the local geometry of the blade is modified together with the corresponding aerodynamic characteristics of its profile.

That first solution presents the advantage of giving rise to significant deformation and twisting. However, that first solution involves adding a flap, thereby giving rise to extra weight and mass remote from the center of gravity, and also giving rise to the presence of mechanical movements that need to be sustained and to turbulence being created at the side edges of the flaps.

The following publications relate to actuating such flaps:

O. Dieterich, B. Enenkl, D. Roth: Trailing edge flaps for active rotor control, Aeroeslastic characteristics of the ADASYS rotor system, American Helicopter Society, $62^{nd}$ Annual Forum, Phoenix, Ariz., May 9-11, 2006, S. R. Hall and E. F. Prechtl: Preliminary Testing of a Mach-Scaled Active Rotor Blade with a Trailing Edge Servo-Flap, Massachusetts Institute of Technology 77 Massachusetts Ave. Cambridge, Mass. 02139-4307 USA, 2000, V. Giurgiutiu: Active-Materials Induced-Strain Actuation for Aeroelastic Vibration Control, The Shock and Vibration Digest, Vol. 32, No. 5, September 2000, 355-368.

F. K. Straub, D. K. Kennedy, D. B. Domzalski, A. A. Hassan, H. Ngo, V. Anand, and T. Birchette: Smart material-actuated Rotor Technology, Journal of intelligent Material Systems and Structures, Vol. 15 Apr. 2004, C. K. Maucher, B. A. Grohmann, P. Jänker, A. Altmikus, F. Jensen, H. Baier: Actuator design for the active trailing edge of a helicopter rotor blade, K. Thanasis: Smart Rotor Blades and Rotor Control for Wind Turbines, State of the Art, UpWind internal report for WP 1B3, December 2006.

Likewise, the following documents U.S. Pat. No. 7,424,988, US 2008/0237395, U.S. Pat. No. 6,513,762, U.S. Pat. No. 5,387,083, WO 00/41501, and WO 96/01503 all mention the presence of flaps.

In a second solution, piezoelectric fibers, piezo-composite patches, or indeed composite macro-fibers are used in the suction side and/or pressure side skin in order to generate twist of the blade. That second solution is described in particular in the following publications:

D. Thakkar, R. Ganguli: Induced shear actuation of helicopter rotor blade for active twist control, Thin-Walled Structures 45 (2007) 111-121.

J. P. Rodgers, N. W. Hagood: Design, manufacture, and testing of an integral twist-actuated rotor blade, $8^{th}$ International Conference on Adaptive Structures and Technology, Wakayama, Japan, 1997.

J. Riemenschneider, S. Keye, P. Wierach, H. Mercier des Rochettes: Overview of the common DLR/ONERA project "active twist blade" (ATB), 30th European Rotorcraft Forum; 14.-16. Sep. 2004; Marseilles, France.

A. Kovalovs, E. Barkanov, S. Gluhihs: Active twist of model rotor blades with D-spar design, Transport—2007, Vol XXII, No 1, 38-44.

G. L. Ghiringhelli, P. Masarati, P. Mantegazza: Analysis of an actively twisted rotor by multibody global modeling, Composite Structures 52 (2001) 113-122.

Patent US 2007/0205332 uses an equivalent technique.

In a third solution, the suction side and the pressure side of the blade are made using skins of composite materials that are anisotropic.

In accordance with the publication "M. D. Schliesman: Improved methods for measurement of extension-twist coupling in composite laminate, Aeronautics and Astronautics, Inc., 1999", traction exerted on such a skin can generate twist of the skin.

According to the publication "S. Ozbay: Extension-twist coupling optimization in composite rotor blades, thesis presented to the Georgia Institute of Technology in May 2006", use is made of a system of sliding masses for generating twist by twisting such skins.

In a fourth technique, use is made of actuators for twisting the blade. For example, U.S. Pat. No. 7,264,200 discloses using an actuator to move flaps arranged at the free second end of the blade.

The documents US 2006/0186269, WO 99/36313, and WO 2007/145718 implements actuators for deforming a structure.

Documents U.S. Pat. No. 7,037,076 and WO 98/30448 use actuators for causing the second end of the blade to turn.

Document U.S. Pat. No. 5,505,589 makes provision for a weight that is movable in order to generate twist.

According to document U.S. Pat. No. 5,150,864, a cable having shape memory is used and it is heated in order to deform the blade.

Consequently, it can be seen that the techniques that seek to twist a blade actively implement members that are dedicated to such twist, such as actuators, weights, or heater means. That results in an increase in the weight of the blade.

It should be observed that Document WO 2008/052677 presents a wind turbine blade provided with an elongate central box structure extending in a longitudinal direction and that twists as a function of the incident wind, that wind striking the box structure in a transverse direction that is substantially perpendicular to the longitudinal direction of the blade.

Document US 2006/0186263 describes means for adjusting the angle of a blade, and more precisely for controlling the pitch of the blade, but not the twist of the blade. For this purpose, use is made of means acting solely on the root of the blade and relying on the physical phenomenon of stiffening in torsion and/or of returning to a flat shape.

The twist relationship of the blade remains unchanged, the twist angle remaining constant all along its span.

Document FR 2 737 465 seeks to minimize noise and vibration by using a device that makes use of an auxiliary actuator and an outer covering that is anisotropic.

Those documents do not form part of the technical field of the invention, i.e. the field of means for twisting a rotor blade enabling the lift of the blade to be optimized, in particular a rotorcraft blade. They are mentioned herein as technological background.

Furthermore, the state of the art includes the following documents WO 96/11337, GB 2 216 606, and EP 0 351 577.

SUMMARY OF THE INVENTION

An object of the present invention is thus to provide a blade with active twist that does not necessarily require the provision of members that are dedicated solely to this application.

According to the invention, a rotor with adaptive twisting is provided with an outer covering extending along a pitch variation axis from a first end zone to a second end zone, the outer covering defining a hollow inside cavity. The first end zone is situated at the first end of the blade, which is suitable for being fastened to a hub, while the second end zone is situated at the second end of the blade, which is free.

The blade is remarkable in particular in that it includes a strip extending inside the cavity, the strip comprising a composite material that is anisotropic so as to be suitable for twisting under the effect of centrifugal forces when the blade is in rotation about an axis of rotation of a rotor, the strip being fastened to the outer covering by first fastener means and second fastener means so as to be capable of twisting the outer covering.

Thus, the strip of anisotropic composite material extends in particular inside the cavity of the blade, said cavity being defined by the inside periphery of the outer covering. When the blade is set into rotation by a hub, centrifugal forces cause the strip to twist, with twist of the strip being the result of the anisotropic nature of the strip. The twist of the strip is thus variable as a function of the speed of rotation of the strip.

It should be observed that the invention seeks to twist a strip that is arranged inside a cavity of the blade, rather than to twist the outer covering of the blade. In addition, the twist is caused by centrifugal force and not by an incident wind impacting against the blade, nor by an actuator.

This innovation is particularly advantageous insofar as centrifugal force in the strip is large.

In order to twist the entire blade, the strip is fastened to the inside periphery of the outer covering. Under such circumstances, centrifugal force twists the strip and the strip then twists the outer covering via the first and second fastener means.

Thus, as a result, the blade is a blade with active twist, its twist varying as a function of the centrifugal force exerted on the anisotropic composite material strip arranged inside its outer covering.

The invention further includes one or more of the following additional characteristics.

For example, said strip comprises a stack of unidirectional composite plies that are antisymmetrical about a middle ply. Alternatively, the strip may comprise a stack of unidirectional fabrics that are antisymmetrical about a middle ply.

The stack may comprise alternating plies of carbon fibers and of glass fibers.

Optionally, the middle ply has a plurality of reference fibers extending in a reference direction, a first ply and a second ply of the stack being disposed symmetrically on either side of the middle ply, the first ply being arranged between the middle ply and a suction side skin of the covering and presenting first fibers at a first angle relative to the reference direction, the second ply being arranged between the middle ply and a pressure side skin of the outer covering and presenting second fibers having a second angle relative to the reference direction, the first angle being opposite to the second angle.

It should be observed that the suction side skin and the pressure side skin may together constitute a single skin. The covering is then a single skin covering, a portion of said single skin representing the pressure side skin and another portion of said single skin representing the suction side skin.

Under such circumstances, the pressure and suction side skins may equally well be two distinct skins or may be represented by two portions of a single skin.

Under such circumstances, it is guaranteed that the stack is anisotropic and antisymmetrical in nature.

It is assumed that the middle ply presents an angle of zero degrees relative to the reference direction. The first ply is constituted for example by fibers presenting a first angle of 30 degrees relative to the reference direction, which means that the second ply is constituted in particular by fibers presenting a second angle of −30 degrees relative to the reference direction.

Furthermore, the middle ply has a plurality of reference fibers extending in a reference direction, which reference direction is parallel to the pitch variation axis.

The strip may perform the function of a spar transferring the forces generated by centrifugal force, thereby optimizing its twisting ability when centrifugal force exerts traction on the blade.

Furthermore, the stack may have varying numbers of plies along the span of the blade in order to optimize twist.

In addition, the strip optionally projects from the first end zone of the covering to represent a first end of the blade suitable for fastening to a hub. A first end portion of the strip is thus fastened to the rotor hub while centrifugal force exerts traction on a second end portion, the traction giving rise to twist of the strip and thus of the blade.

To maximize twist, the first fastener means present an offset relative to the second fastener means along a chord of the blade.

For example, the outer covering comprises a pressure side skin and a suction side skin, which skins are distinct or together form a single covering skin, the strip comprises a front zone close to the leading edge of the blade and a rear zone close to the trailing edge of the blade, the first fastener means fastening the front zone to one of the skins, and the second fastener means fastening the rear zone to the other skin to which the front zone is not fastened. The offset along the chord of the blade is then optimized.

Furthermore, the first fastener means extend in the cavity along a first longitudinal direction parallel to the pitch variation axis, and the second fastener means extend in the cavity along a second longitudinal direction parallel to the pitch variation axis.

The first fastener means may be a continuous section member extending along the first longitudinal direction, or it may comprise a plurality of section members disposed along the first longitudinal direction. Similarly, the second fastener means may be a continuous section member extending along the second longitudinal direction, or may comprise a plurality of section members disposed along the second longitudinal direction.

Furthermore, the blade includes an internal spar, i.e. a leading edge spar connecting together a pressure side skin and a suction side skin of said outer covering.

In order to obtain greatest advantage from the effects of centrifugal force, the section along the chord of the leading edge spar is very small so that most of the centrifugal force is taken up by the strip. As a result the blade is capable of twisting over a large amplitude.

In another aspect, the blade includes a trailing edge ledge connecting together the pressure side skin and the suction side skin of said outer covering. Optionally, a filling material is placed between the rear zone of the strip and the ledge, the filling material not impeding twisting of the blade, and possibly even enhancing said twist.

With the outer covering comprising a pressure side skin and a suction side skin, and in order to optimize twist, it is also possible for at least one of the skins to comprise a composite material that is anisotropic.

Likewise, the blade may include adjustment means for modifying the position of the center of gravity of the blade, in particular the position of the center of gravity of the blade along the span of said blade. By varying the position of the center of gravity in this way, the centrifugal force that is applied to the strip is caused to vary, thereby varying the resulting twist of the blade.

In another aspect, at least one segment of said blade is twisted, said at least one segment of said blade presenting a twist relationship. Thus, the entire strip presents a twist relationship, or at least a segment of the strip presents such a relationship. In flight, centrifugal force increases twist or decreases twist, as the case may be.

Furthermore, at least one segment of the outer covering is twisted, said at least one segment of the outer covering presenting a twist relationship.

In addition to a blade, the invention also provides a rotorcraft rotor having a hub and a plurality of blades, the rotor being provided with at least one blade of the invention as described above.

More particularly, the invention relates to a helicopter type rotorcraft.

BRIEF DESCRIPTION OF THE DRAWINGS

The invention and its advantages appear in greater detail from the following description of embodiments given by way of illustration and with reference to the accompanying figures, in which:

FIG. 1 is a view of a blade of the invention;
FIG. 2 is a diagram showing a variant of the invention;
FIG. 3 is a section of a blade in a first embodiment;
FIG. 4 is a section of a blade in a second embodiment;
FIG. 5 is a section of a strip of the invention; and
FIG. 6 is a diagram showing a variant of said strip.

DETAILED DESCRIPTION OF THE PREFERRED EMBODIMENTS

Elements that are present in more than one of the figures are given the same references in each of them.

Three mutually orthogonal directions are referenced X, Y, and Z, as can be seen in FIGS. 1 and 2.

The direction X is said to be transverse. The term "width" relates to a transverse dimension of the blade in said transverse direction X.

Another direction Y is said to be a reference direction insofar as the blade extends along said direction Y. Directions that are said to be "longitudinal" and the axis about which the pitch of the blade is varied are parallel to this reference direction.

Finally, a third direction Z is in elevation and corresponds to the height dimensions of the structures described. The term "thickness" then relates to an elevation dimension along this elevation direction.

FIG. 1 is a diagrammatic view of a blade 1 of the invention. The blade 1 extends from a first end 1' fastened to a hub 110 of a rotorcraft rotor 100 to a second end 1" that is free.

The blade 1 has an outer covering 2 extending from a first end zone 3 at the first end 1' of the blade 1 to a second end zone 4 at the second end 1" of the blade 1. This outer covering 2 is provided with a suction side skin 2' and a pressure side skin 2" that together define a cavity 8 inside the outer covering 2.

The outer covering 2 is thus hollow, at least in part.

Furthermore, the blade 1 has a leading edge spar 20 and a trailing edge ledge 30 between the suction side and pressure side skins 2' and 2". It should be observed that the cross-section of the leading edge spar 20 is minimized, its function consisting essentially in protecting the blade 1 against impacts.

The blade 1 also has a strip 10 acting as a spar for the purpose of transmitting the forces to which the blade 1 is subjected to the hub 110.

The strip 10 is elongate and extends inside the cavity 8 in a direction going from the second end zone 4 towards the first end zone 3.

It should be observed that flexible filling that does not impede deformation of the strip 10 may be arranged between the strip 10 and the outer covering in order to avoid the covering deforming under the effect of outside pressure. In order to maximize twist and guarantee the integrity of the blade under the effect of the forces exerted on the blade in flight, the covering has a compression modulus that is high and a shear modulus that is very low. The filling is thus rigid in compression and flexible in shear.

Furthermore, the strip 10 projects from the first end zone 3 of the outer covering 2 so as to be fastened to the hub 110. The strip 10 then extends in a reference direction Y parallel to the pitch variation axis AY of the blade 1. The strip 10 thus extends radially relative to the hub 110.

It should be observed that a sleeve may be arranged between the strip 10 and the hub 110. In another variant, the strip 10 is connected to a cuff incorporated in the blade 1, the incorporated cuff extending the outer covering so as to be fastened to the hub 110.

Thus, the strip 10 takes up at least a substantial fraction of the centrifugal force F exerted on the blade 1.

Furthermore, the strip 10 is connected to the outer covering 2 by first and second fastener means 11 and 12. The second fastener means 12 are offset relative to the first fastener means 11 along the chord of the blade 1. Under such circumstances, within each profile (or section) of the blade provided with first and second fastener means 11 and 12, the first fastener means 11 are offset transversely relative to the second fastener means 12 along the chord of the profile.

Furthermore, it should be observed that the first fastener means 11 extend inside the cavity 8 along a first longitudinal direction D1 parallel to the pitch variation axis AY, and the second fastener means 12 extend inside the cavity 8 along a second longitudinal direction D2 parallel to the pitch variation axis AY.

In the preferred variant shown in FIG. 1, the first fastener means 11 comprises a single continuous section member, e.g. presenting a channel section. Similarly, the second fastener means 12 comprises a single continuous section member, such as a channel-section member.

With reference to FIG. 2, in an alternative variant, at least one of the fastener means comprises a plurality of section members distributed along a longitudinal direction. For example, the first fastener means 11 may comprise a plurality of section members 11', each possibly presenting a U-shape. Similarly, the second fastener means 12 may comprise a plurality of section members 12', e.g. of U-shaped shape.

With reference to FIG. 1, and independently of the variant, the strip 10 extends transversely from a front zone 14 close to the leading edge of the blade 1 towards a rear zone 15 close to the trailing edge of the blade 1. The first fastener means 11 fasten the front zone 14 to one of the skins 2', 2", and the second fastener means 12 fasten the rear zone 15 to the other skin 2", 2' that is not fastened to the front zone 14.

With reference to FIG. 3, the first fastener means 11 secure the front zone 14 to the pressure side skin 2", and the second fastener means 12 secure the rear zone 15 to the suction side skin 2'.

It should be observed that it is possible to arrange a filling material 40 between the trailing edge ledge 30 and the rear zone 15. This filling material serves to prevent the outer covering flattening or swelling under the effect of pressure.

With reference to FIG. 4, in an alternative version, the first fastener means 11 secure the front zone 14 to the suction side skin 2', and the second fastener means 12 secure the rear zone 15 to the pressure side skin 2".

Consequently, with reference to FIG. 1, deformation of the strip 10 gives rise to deformation of the outer covering 2 of the blade 1 via the first fastener means 11 and the second fastener means 12.

Furthermore, the strip 10 is made of a composite material that is anisotropic. Traction in the reference direction Y along which the strip 10 extends thus gives rise to twist of the strip 10. Likewise, compression gives rise to opposite twist, as indeed does a reduction of a given level of traction.

It should be recalled that the blade 1 and in particular its strip 10 are subjected to centrifugal force F when the blade 1 is driven in rotation by the hub 110.

Since a first end portion 10' of the blade 1 is fastened directly or indirectly to the hub, the 10 centrifugal force F parallel to the pitch variation axis AY exerts traction on a second end portion 10" of the blade 1.

The anisotropic nature of the strip 10 causes the strip 10 to twist, and consequently causes the outer covering 2 to twist from a rest state of the strip, the blade not being subjected to centrifugal force when the rotor is stationary. The twist of the blade 1 thus varies as a function of centrifugal force F.

In order to optimize the blade 1, it is possible to arrange adjustment means 50 for modifying specifically the position of the center of gravity of the blade 1 along the span of the blade. By modifying this position, the centrifugal force exerted on the blade 1 is modified. For example, the adjustment means 50 comprise a weight 52 capable of sliding along a slide shaft 51 with the help of mover means (not shown), the slide shaft extending parallel to the span of the blade, for example. The mover means may comprise a motor e.g. serving to rotate a sliding shaft, the sliding shaft comprising a wormscrew.

Similarly, it is possible to envisage fitting the blade with conventional means for twisting the blade 1, e.g. means that may be housed equally well in the suction side skin 2' and/or in the pressure side skin 2", or indeed to provide it with trailing edge flaps.

Furthermore, in order to have an optimized anisotropic nature, the strip 10 comprises a stack 13 of unidirectional plies, each ply having strong fibers extending parallel to a given direction, these fibers being embedded in a matrix, e.g. of the resin type, that is not so strong.

With reference to FIG. 5, the stack 13 comprises a middle ply 200 extending along the reference direction Y parallel to the pitch variation axis AY of the blade. This middle ply comprises for example fibers that extend parallel to the reference direction Y in order to transmit the centrifugal force to the hub. By definition, it is assumed that the middle ply has fibers that are at 0° relative to the reference direction.

Between the middle ply and the suction side skin, the stack has a plurality of plies, each referred to as a "first" ply 201, 211, 221, 231, 241, 251, 261, for convenience. Conversely, between the middle ply and the pressure side skin, the stack comprises a plurality of plies, each referred to as a "second" ply 202, 212, 222, 232, 242, 252, 262, for convenience.

It should be observed that the stack may comprise in alternation plies of carbon fibers and plies of glass fibers. Under such circumstances, and with the exception of the bottom and top plies 262 and 261 defining the limits of the strip in elevation, each glass fiber ply is arranged between two carbon fiber plies and each carbon fiber ply is arranged between two glass fiber plies. The middle ply is optionally made of glass fibers.

Furthermore, the direction of the fibers in any one ply differs from the direction given to the fibers in an adjacent ply. For example, each of the fibers in a given ply presents an angle of 60° relative to the reference direction followed by the fibers of the middle ply, each of the fibers of a ply adjacent to said given ply presenting an angle of 90° relative to the reference direction. It should be observed that the term "angle relative to the reference direction" is used to mean the angle between the direction of a fiber of a given ply and a direction given to said given ply, said given direction being contained in a plane defined by the given ply in question and being parallel to the reference direction of the middle ply.

In order to maximize its anisotropic nature, the stack is also antisymmetrical.

For each first ply 201, 211, 221, 231, 241, 251, 261 placed symmetrically relative to a corresponding second ply 202, 212, 222, 232, 242, 252, 262 of the stack relative to the middle ply 200, with each first ply presenting first fibers at a first angle relative to the reference direction Y, and for each corresponding second ply 202, 212, 222, 232, 242, 252, 262 presenting second fibers having a second angle relative to said reference direction Y, the first angle is opposite to the second angle. For example, if the first angle is 60°, then the second angle is −60°.

It can nevertheless be understood that if the first angle is 90° or 0°, then the first fibers and the second fibers are parallel.

For example, going from the pressure side towards the suction side of the blade, the strip comprises the following stack 13:
- a second ply 262 presenting carbon fibers oriented at +30° relative to the orientation of the fibers of the middle ply;
- a second ply 252 presenting glass fibers oriented at +0° relative to the orientation of the fibers of the middle ply;
- a second ply 242 presenting carbon fibers oriented at −60° relative to the orientation of the fibers of the middle ply;
- a second ply 232 presenting glass fibers oriented at +90° relative to the orientation of the fibers of the middle ply;
- a second ply 222 presenting carbon fibers oriented at −60° relative to the orientation of the fibers of the middle ply;
- a second ply 212 presenting glass fibers oriented at +90° relative to the orientation of the fibers of the middle ply;
- a second ply 202 presenting carbon fibers oriented at +30° relative to the orientation of the fibers of the middle ply;
- a middle ply 200 presenting glass fibers, the middle ply presenting thickness that is substantially equal to twice the thickness of each first or second ply;
- a first ply 201 presenting carbon fibers oriented at −30° relative to the orientation of the fibers of the middle ply;
- a first ply 211 presenting glass fibers oriented at −90° relative to the orientation of the fibers of the middle ply;
- a first ply 221 presenting carbon fibers oriented at +60° relative to the orientation of the fibers of the middle ply;
- a first ply 231 presenting glass fibers oriented at −90° relative to the orientation of the fibers of the middle ply;
- a first ply 241 presenting carbon fibers oriented at +60° relative to the orientation of the fibers of the middle ply;
- a first ply 251 presenting glass fibers oriented at 0° relative to the orientation of the fibers of the middle ply; and
- a first ply 261 presenting carbon fibers oriented at −30° relative to the orientation of the fibers of the middle ply.

Finally, with reference to FIG. 6, the stack may optionally have a number of plies that varies along the span of the blade.

Thus, it is possible to adapt twist over the entire length of the blade as described above, and also to have a different value locally over a given segment.

For example, in a first zone S1 situated close to the first end portion 10' of the strip 10, i.e. close to the first end of the blade 1, the strip has a first number of plies.

Similarly, in a second zone S2 situated after the first zone S1, the strip has a second number of plies that is different from the first number of plies.

Finally, in a third zone S3 situated close to the second end portion 10' of the strip 10 and following the second zone S2, the strip has a third number of plies.

Optionally, the number of plies may be degressive, the first number of plies being greater than the second number of plies, and the second number of plies being greater than the third number of plies.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

For example, the blade may comprise a stack of unidirectional woven fabrics that are antisymmetrical relative to the middle ply, instead of using composite plies.

Furthermore, the figures show a strip and an outer covering, each of which is contained in a plane when at rest, i.e. when there is no centrifugal force. Nevertheless, at least one segment of the strip and/or at least one segment of the outer covering may present twist in compliance with a given twist relationship.

What is claimed is:

1. A rotor blade with adaptive twisting, the blade being provided with an outer covering extending along a pitch variation axis from a first end zone to a second end zone, the outer covering defining an internal cavity, the blade including a strip extending inside said cavity, said strip comprising a composite material that is anisotropic and that is twisting under the effect of centrifugal forces when the blade is in rotation, said strip being fastened to said outer covering by first fastener means and second fastener means that twist as the strip is twisting thereby twisting said outer covering.

2. A blade according to claim 1, said strip comprising a stack of unidirectional composite plies that are antisymmetrical about a middle ply.

3. A blade according to claim 2, said middle ply having a plurality of reference fibers extending in a reference direction, a first ply and a second ply of the stack being disposed symmetrically on either side of said middle ply, said first ply being arranged between said middle ply and a suction side skin of said outer covering and presenting first fibers at a first angle relative to said reference direction, said second ply being arranged between said middle ply and a pressure side skin of said outer covering and presenting second fibers having a second angle relative to said reference direction, said first angle being equal and opposite to said second angle.

4. A blade according to claim 2, said middle ply having a plurality of reference fibers extending in a reference direction, which reference direction is parallel to said pitch variation axis.

5. A blade according to claim 2, said stack having varying numbers of plies along the span of said blade.

6. A blade according to claim 1, an end of said strip projecting from said first end zone of said covering to represent a first end of the blade suitable for fastening to a hub.

7. A blade according to claim 1, said first fastener means being spaced apart from said second fastener means on the strip by an offset along a chord of the blade such that the first and second fastener means are connected to opposed ends of the strip, wherein the first and second fastener means are independent of overlap across the strip.

8. A blade according to claim 1, said first fastener means extending in the cavity along a first longitudinal direction parallel to said pitch variation axis, and the second fastener means extending in the cavity along a second longitudinal direction parallel to said pitch variation axis.

9. A blade according to claim 1, said outer covering comprising a pressure side skin and a suction side skin, said strip comprising an intermediate zone positioned between a front zone close to a leading edge of the blade and a rear zone close to a trailing edge of the blade, said first fastener means fastening the front zone to one of said skins, and the second fastener means fastening the rear zone to the other skin to which the front zone is not fastened, wherein the first and second fastener means are spaced apart from one another by the intermediate zone.

10. A blade according to claim 1, including a leading edge spar connecting a pressure side skin to a suction side skin of said outer covering.

11. A blade according to claim 1, including a trailing edge ledge positioned between and connecting a pressure side skin to a suction side skin of said outer covering.

12. A blade according to claim 1, said outer covering comprising a pressure side skin and a suction side skin, and at least one of the skins comprising a composite material that is anisotropic.

13. A blade according to claim 1, at least one segment of said blade having the first and second fastener means being twisted, said at least one segment of said blade presenting a twist relationship.

14. A rotorcraft rotor having a hub and a plurality of blades, at least one blade being according to claim 1.

15. The rotorcraft blade according to claim 1 wherein the strip lies along and is parallel with a chord of the blade.

16. A rotor blade with adaptive twisting, the blade comprising:
an outer covering extending along a pitch variation axis from a first end zone to a second end zone, the outer covering defining an internal cavity;
an anisotropic composite strip extending inside said cavity and comprising a stack of unidirectional fibers oriented in a first direction, a first ply of unidirectional fibers oriented in a second direction and a second ply of unidirectional fibers oriented in a third direction; and
first and second fasteners connecting opposed ends of the strip to the outer covering, each fastener extending between the outer covering and a respective end of the strip;
wherein the strip is adapted to twist in response to centrifugal forces caused by rotation of the blade; and
wherein the first and second fasteners are configured to twist in response to the strip twisting thereby causing the outer covering to twist.

17. The rotor blade of claim 16 wherein the first ply is adjacent to the second ply; and
wherein the first direction is parallel to the pitch variation axis.

18. A rotorcraft blade comprising:
an outer covering extending along a pitch variation axis from a first end zone to a second end zone, the outer covering defining an internal cavity;
a spar provided by an anisotropic composite strip extending inside said cavity and having a first end and a second end, the first end adjacent to the first end zone of the outer covering, the second end projecting beyond the second end zone of the outer covering and adapted to connect to a hub of a rotorcraft, the anisotropic composite strip comprising a stack of unidirectional fibers oriented to be parallel to the twist variation axis, a first ply of unidirectional fibers oriented in a first direction, and a second ply of unidirectional fibers oriented in a second direction, wherein the stack, the first ply, and the second ply extend from the first end to the second end of the strip, wherein twist of the strip is a function of a speed of rotation of the strip such that the strip twists along the pitch variation axis in response to centrifugal forces imposed on the strip when the blade is in rotation to provide active twist; and
first and second fasteners connecting the strip to the outer covering, the first and second fasteners configured to twist in response to the strip twisting to twist the outer covering.

19. The rotorcraft blade of claim 18 wherein each of the first and second fasteners comprise an open channel extending between the first and second ends of the strip;
wherein the first fastener is positioned adjacent to the leading edge of the blade, and the second fastener is positioned adjacent to the trailing edge of the blade; and
wherein a rear edge of the first fastener is spaced apart from a front edge of the second fastener by an offset along a chord of the blade such that the first fastener is independent of an overlap with the second fastener.

20. The rotorcraft blade of claim 18 wherein each of the first and second fasteners comprise a plurality of U-shaped section members distributed longitudinally between the first and second ends of the strip.

* * * * *